(12) United States Patent
Steine et al.

(10) Patent No.: US 10,851,600 B2
(45) Date of Patent: Dec. 1, 2020

(54) STOP COLLAR ATTACHMENT

(71) Applicant: Ace Oil Tools AS, Randaberg (NO)

(72) Inventors: Ken Erik Steine, Hafrsfjord (NO);
Lasse Hetland, Stavanger (NO);
Morten Klausen, Mosterøy (NO)

(73) Assignee: Ace Oil Tools AS, Randaberg (NO)

( * ) Notice: Subject to any disclaimer, the term of this patent is extended or adjusted under 35 U.S.C. 154(b) by 114 days.

(21) Appl. No.: 15/961,304

(22) Filed: Apr. 24, 2018

(65) Prior Publication Data

US 2018/0305985 A1   Oct. 25, 2018

(51) Int. Cl.
| | | |
|---|---|---|
| *E21B 17/046* | (2006.01) | |
| *E21B 17/10* | (2006.01) | |
| *F16L 37/10* | (2006.01) | |
| *F16L 55/07* | (2006.01) | |

(52) U.S. Cl.
CPC ........ *E21B 17/046* (2013.01); *E21B 17/1014* (2013.01); *E21B 17/1028* (2013.01); *E21B 17/1078* (2013.01); *F16L 37/10* (2013.01); *F16L 55/07* (2013.01)

(58) Field of Classification Search
CPC .............. E21B 17/1078; E21B 17/046; E21B 17/1014; E21B 17/1028; F16L 37/10; F16L 55/07
See application file for complete search history.

(56) References Cited

U.S. PATENT DOCUMENTS

| | | | |
|---|---|---|---|
| 3,040,405 A | 6/1962 | Solum | |
| 6,367,556 B1 | 4/2002 | Moore | |
| 6,679,325 B2 * | 1/2004 | Buytaert | E21B 17/1028 166/174 |
| 8,573,296 B2 * | 11/2013 | Levie | E21B 17/1078 166/241.1 |
| 8,832,906 B2 * | 9/2014 | Buytaert | B25B 27/10 24/20 R |

(Continued)

FOREIGN PATENT DOCUMENTS

| | | | | |
|---|---|---|---|---|
| GB | 1173895 A | | 12/1969 | |
| GB | 2398807 A | * | 9/2004 | ......... E21B 17/1035 |
| WO | 2017009440 A1 | | 1/2017 | |

OTHER PUBLICATIONS

Combined Search and Examination Report for GB 1919265.7, dated Mar. 25, 2020.

(Continued)

*Primary Examiner* — Daniel P Stephenson
(74) *Attorney, Agent, or Firm* — Andrus Intellectual Property Law, LLP

(57) ABSTRACT

A method of connecting an end part of a pipe attachment device to a part of a function element, includes: aligning longitudinal axes of a substantially tubular end part of a pipe attachment device and a substantially tubular part of a function element; applying a force that moves the end part of the pipe attachment device relatively towards the part of the function element along the longitudinal axis. Contact between the end part of the pipe attachment device and the part of the function element causes each of a plurality of fingers on the end part to elastically deflect. Applying the force so that each of the plurality of fingers on the end part returns from their deflected position and is retained in one or more holes in the part of the function element.

28 Claims, 12 Drawing Sheets

(56) References Cited

U.S. PATENT DOCUMENTS

| | | | | |
|---|---|---|---|---|
| 9,771,763 | B2* | 9/2017 | McDaniel | E21B 17/1028 |
| 9,982,494 | B2* | 5/2018 | Steine | E21B 17/10 |
| 2002/0139537 | A1* | 10/2002 | Young | E21B 17/1028 |
| | | | | 166/378 |
| 2003/0106719 | A1 | 6/2003 | Herrera | |
| 2003/0150611 | A1* | 8/2003 | Buytaert | E21B 17/1028 |
| | | | | 166/241.6 |
| 2011/0030973 | A1* | 2/2011 | Jenner | E21B 37/02 |
| | | | | 166/382 |
| 2015/0191982 | A1* | 7/2015 | Steine | E21B 17/10 |
| | | | | 166/241.6 |
| 2018/0305985 | A1* | 10/2018 | Steine | E21B 17/1028 |

OTHER PUBLICATIONS

International Search Report and Written Opinion for PCT/EP2018/060632, dated Sep. 5, 2018.
Search and Examination Report for GB1706590.5, dated Jun. 30, 2017.

* cited by examiner

STOP COLLAR ATTACHMENT

CROSS-REFERENCE TO RELATED APPLICATIONS

This application claims priority to GB Patent Application No. 1706590.5, filed Apr. 25, 2017, which is incorporated herein by reference, in entirety.

FIELD

The field of the present invention relates to the attachment of stop collars to pipes and the support of function elements by stop collars. Embodiments provide improved stop collars with advantages that include one or more of easier attachment to a pipe, cheaper construction, quicker attachment to a pipe, stronger attachment to a pipe and advantageous support of a function element.

BACKGROUND

Preparing for the extraction of hydrocarbons, such as oil and gas, from subsea deposits involves many processes and requires an array of different machinery and tools. After the hole of a subsea well has been drilled, a completion string is lowered into the hole to allow the flow of hydrocarbons from a reservoir to a subsea wellhead on the sea floor and then onto a surface wellhead above the surface of the sea. The completion string is formed of a series of sections of pipe connected together to form a flow channel. Function elements are provided on the outside of sections of pipe of the completion string. Examples of function elements are centralisers for ensuring that the pipe is correctly positioned within the drilled hole and supports for cables and tracers.

A stop collar is a known component for attaching to the outside of a pipe in order to keep function elements in a desired position, or range of positions, on the outside of a pipe. It is known to attach a first stop collar to a pipe, provide a centraliser around the pipe and then attach a second stop collar to the pipe, with the centraliser between the two stop collars. The inner diameter of the centraliser is a larger diameter than the outer diameter pipe but less than the outer diameter of each of the stop collars. The centraliser is therefore free to rotate and move axially along the pipe, with the extent of the axial movement restricted by the spacing between the stop collars as the centraliser cannot move past either of the stop collars.

It is known for stop collars to be attached to a pipe by welding the stop collar to the pipe. However, the welding process is complicated, slow and expensive. It is also known for stop collars to be attached to a pipe by screwing two halves of a hinged collar together. However, the screws are provided on the outer surface of the stop collar with the longitudinal axes of the screws perpendicular to the longitudinal axis of the stop collar. The screws therefore result in the maximum outer diameter of the stop collar being significantly increased. This unsuitable for low tolerance applications such as when an inner pipe is provided within an outer pipe.

There is a general need to improve on known stop collar designs and the support of function elements on pipes by stop collars.

SUMMARY OF INVENTION

Embodiments of the invention are set out in the independent claims. Preferred aspects of embodiments are set out in the dependent claims.

The following reference signs have been provided throughout the figures:

100—Is a stop collar according to an embodiment;
101—Is a stop collar part of a split ring band according to an embodiment;
102—Is a stop collar part of a sleeve according to an embodiment;
103—Is a pin for inserting in a stop collar part according to an embodiment;
104—Is a finger of a stop collar part according to an embodiment;
200—Is a stop collar part of a sleeve according to an embodiment;
201—Is a wall of a stop collar part of a sleeve according to an embodiment;
202—Is a stop collar part of a spit ring collar according to an embodiment;
203—Is a finger of a stop collar part according to an embodiment;
301—Is a stop collar part of a sleeve according to an embodiment;
302—Is a part of the sleeve according to an embodiment;
303—Is hinged ends of the sleeve parts according to an embodiment;
304—is interlocking parts of the sleeve parts according to an embodiment;
401—Is a stop collar part of a sleeve according to an embodiment;
402—Is a part of the sleeve according to an embodiment;
403—Is a sliding dovetail joint according to an embodiment;
500—Is a stop collar part of a split ring band according to an embodiment;
501—Is an end of a stop collar part for attaching to a function element according to an embodiment;
502—Is one or more fingers of an end of a stop collar part for attaching to a function element according to an embodiment;
503—Is a recess on the inner surface of a finger according to an embodiment;
504—Is a recess on the outer surface of a finger according to an embodiment;
505—Is a split ring band according to an embodiment;
506—Is an end of a function element according to an embodiment;
507—Is a recess in an end of a function element according to an embodiment;
600—Is a pipe;
601—Is a function element according to an embodiment;
602—is an end of a function element according to an embodiment;

603—is holes in the end of the function element according to an embodiment;

700—Is a function element;

701—Is an obstruction that has been provided on the outer surface of a pipe; and

702—Is an end of a function element according to an embodiment.

DETAILED DESCRIPTION

Embodiments of the present invention improve the attachment of stop collars to pipes and/or the support of function elements on pipes.

A stop collar 100 according to first embodiment is shown in FIGS. 1A to 1F.

The stop collar 100 comprises two parts, namely a sleeve 102 and a split ring band 101. In use, the split ring band 101 is installed within the sleeve 102. The sleeve 102 and split ring band 101 can be considered to be a male-female connection with the sleeve 102 being the female part and the split ring band 101 the male part.

Figure 1A:
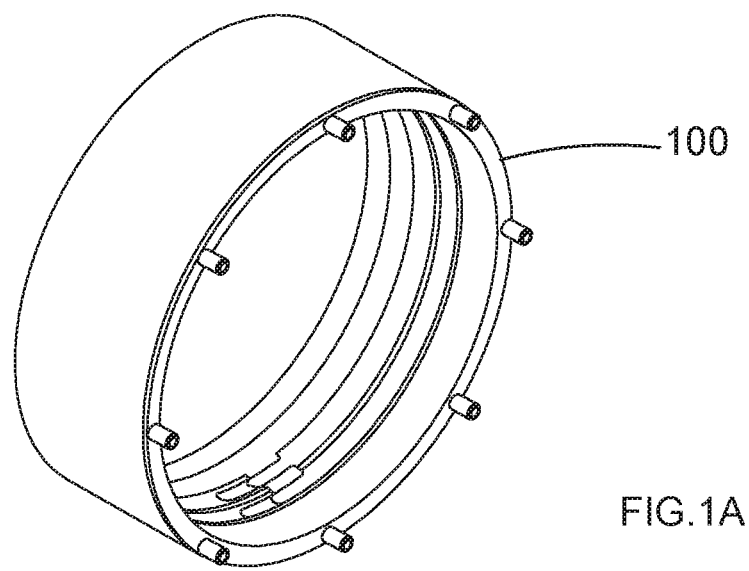
FIGS. 1A, 1B, 1C, 1D, 1E, and 1F show a stop collar and/or stop collar components according to an embodiment.
Figure 1B:
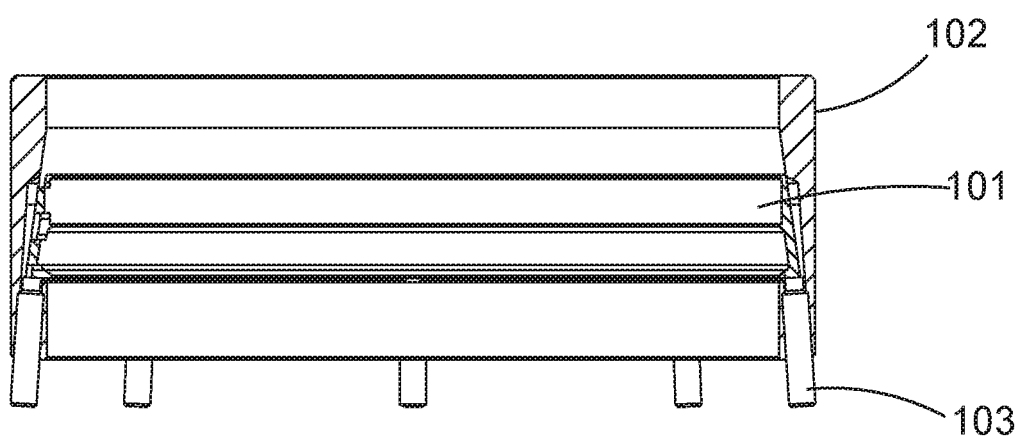
Figure 1C:
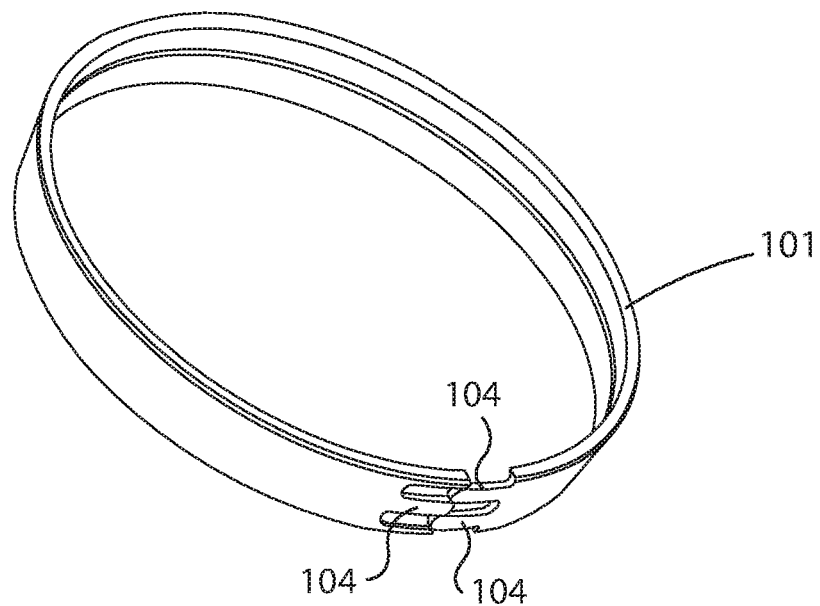
Figure 1D:
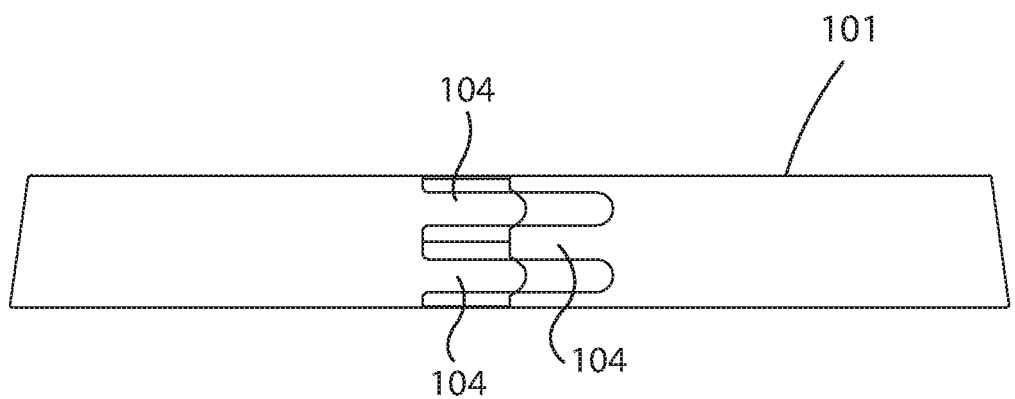
Figure 1E:
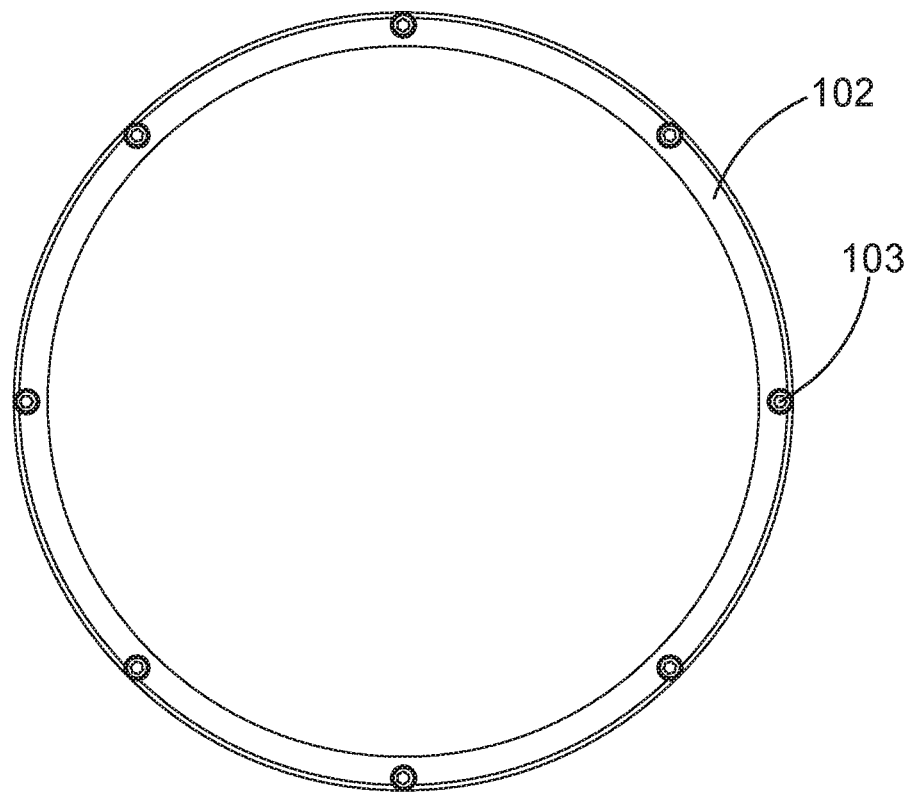
Figure 1F:
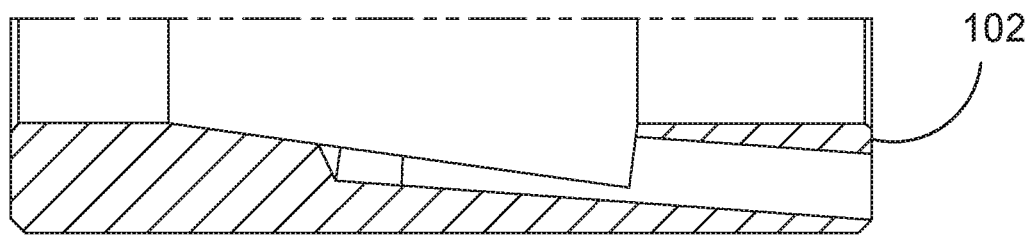

The sleeve 102 is shown on its own in FIGS. 1E and 1F. The sleeve 102 is substantially tubular. Around one of the annular end faces of the sleeve 102 a number of holes are drilled. The holes are preferably slightly angled from parallel to the longitudinal axis of the sleeve, as shown in FIG. 1F. As also shown in FIG. 1F, the sleeve 102 also comprises a recess in its inner surface that extends around the entire inner circumference of the sleeve. The recess is tapered along the longitudinal axis of the sleeve 102 and is therefore shaped like part of the surface of a cone.

The split ring band 101 is shown in FIGS. 1C and 1D. When the split ring is closed, the shape of the split ring band 101 is substantially shaped like a nozzle. That is to say, the split ring band 101 is substantially tubular with a tapering on its outer surface such that it is shaped like part of the surface of a cone.

The split ring 101 preferably has interlocking fingers 104 at each end of the band, as shown in FIGS. 1C and 1D. However, embodiments also include the split being a linear slot and there being no interlocking between the two ends of the band. On the inner surface of the split ring band 101 teeth are provided. The teeth are one or more raised ridges on the inner surface that extend around the entire inner circumference of the split ring band 101.

FIGS. 1A and 1B show the split ring band 101 installed within the recess of the sleeve 102 to thereby provide a stop collar 100 for attaching to a pipe. The angle of the taper in the recess corresponds to the angle of the taper of the outer surface of the split ring band 101. The split ring band 101 is installed within the sleeve 102 by closing the split ring band 101 so that its maximum outer circumference is less than the inner circumference of the sleeve 102. The split ring band 101 is installed within the sleeve 102 by positioning it next to the recess in the sleeve 102 and opening the split ring band 101 to provide a stop collar 100 that is ready for use.

In use, the stop collar 100 is slid over the end of a pipe, or pipe section, that the stop collar is to be attached to. The stop collar is attached to the pipe by inserting pins 103 into the holes in the sleeve 102. The inserted pins 103 press against the split ring band and move the split ring band along the taper of the recess so that the split ring band moves axially relative to the sleeve. This has the effect of bringing the teeth on the inner surface of the split ring band into contact with the pipe. Further insertion of the pins increases the grip of the pipe by the split ring band and thereby attaches the stop collar to the pipe.

There are a number of different ways in which the pins 103 may be secured in place. For example, the pins may be welded in place. Alternatively, the pins 103 may be heated and then allowed to cool when in the correct position. Alternatively, the pins and/or holes may be wedge shaped so that the insertion of the pins holds the pins in place without heating or welding being required. The pins may also be held in place by the use of an adhesive. Other techniques may also be used to hold the pins in place and more than one of the techniques may be used in combination with each other to hold the pins in the desired position. Instead of pins, other suitable elements may be inserted into the holes to force the teeth of the split ring band against the pipe. These include screws, dowels or other types of rod. If screws are used then the screws may be self-tapping, or the holes may be tapped prior to the screws being inserted.

An advantage of the stop collar 100 of the present embodiment is that the outer diameter of the pipe that the stop collar is attached to can be within a relatively wide tolerance range as the variable inner circumference of the split ring band allows the same stop collar to be easily attached to pipes with differing outer diameters. The gripping force against the pipe can also be easily controlled to a high level by the force used to push the pins into the holes. Another advantage is that the pins are inserted substantially along the axis of the stop collar within the sleeve and so they do not significantly increase the outer diameter of the stop collar. Further advantages include the simple and low cost of the construction of the stop collar as well as the stop collar being easily attachable to a pipe.

The first embodiment also includes a number of modifications and variations to the stop collar as described above.

One or more ridged groves/raised ridges may be provide on the outer surface of the split ring band. A plurality of ridged groves/raised ridges may also be provided on an inner surface of the recess in the sleeve. The ridges on the split ring band and the sleeve together form a ratchet so that after the split ring band has been pressed by the pins into a position where it sufficiently grips the pipe, the ratchet holds the split ring band in position. Advantageously, the pins may then either be removed or maintained in place with the required holding of the split ring band in position by the pins reduced or avoided.

The split ring band 101 may also be provided without teeth on its inner surface. Although the use of teeth aids the gripping of the pipe, by not having teeth damage to the pipe by the teeth is avoided.

A stop collar according to a second embodiment is shown in FIGS. 2A to 2F.

The stop collar is comprised of two parts, namely a split ring collar 202 and a sleeve 200. In use, at least part of the split ring collar 202 is encircled by the sleeve 200 and the sleeve and split ring collar 202 are therefore a male-female connection with the sleeve 200 being the female part and the split ring collar 202 the male part.

Figure 2A:
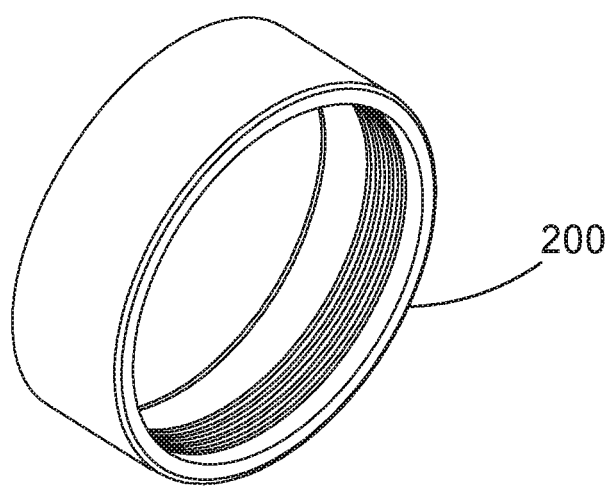
FIGS. 2A, 2B, 2C, 2D, 2E, and 2F show stop collar components according to an embodiment.
Figure 2B:
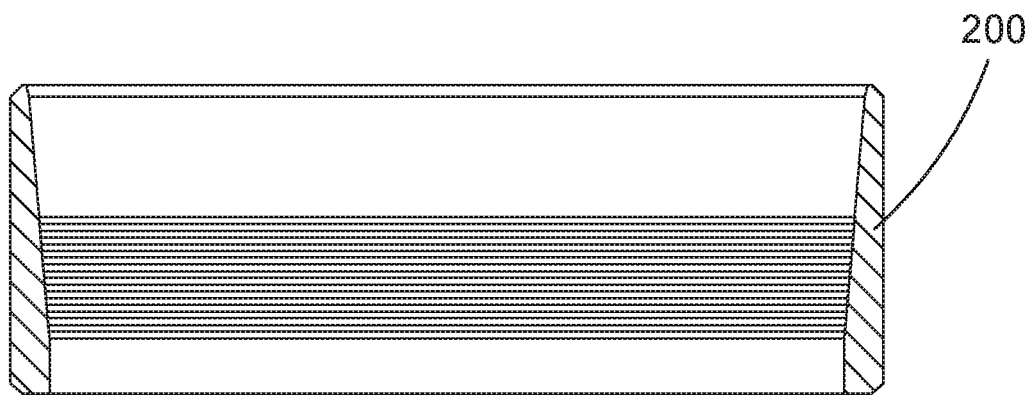
Figure 2C:
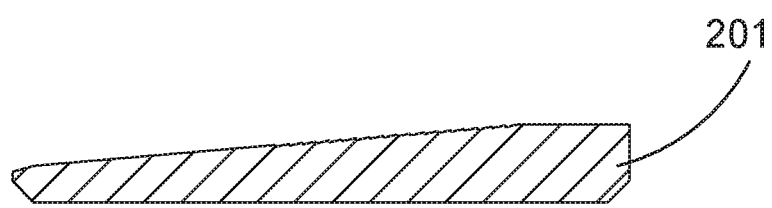
Figure 2D:
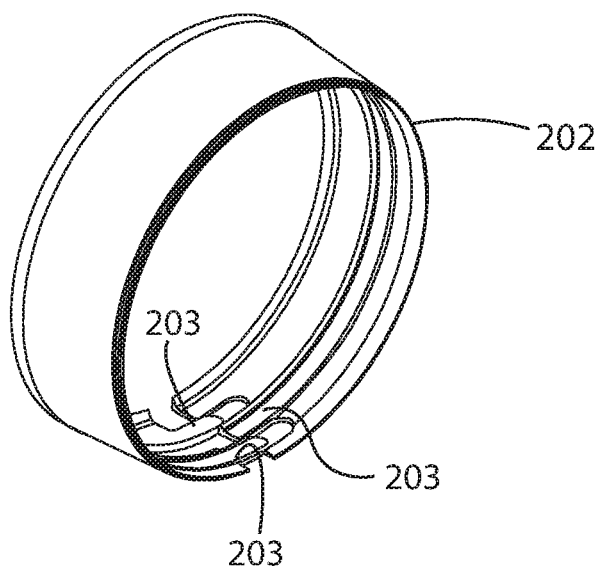
Figure 2E:
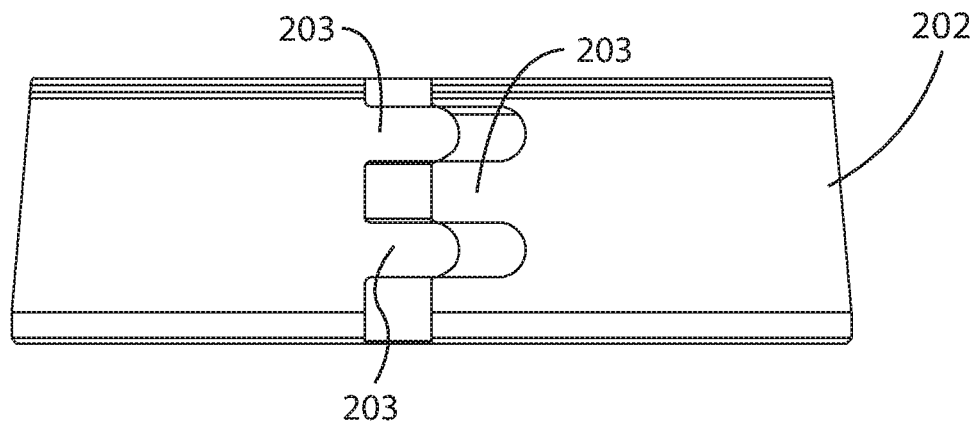
Figure 2F:
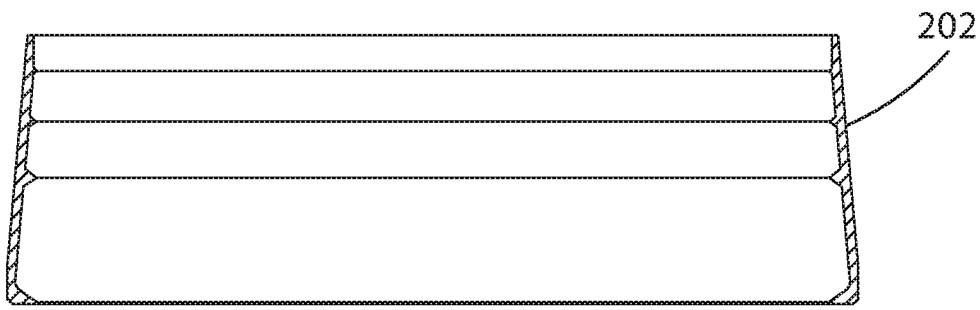

The split ring collar 202 is shown in FIGS. 2D to 2F. When the split ring is closed, the shape of the split ring collar 202 is substantially shaped like a nozzle. That is to say, the split ring collar 202 is substantially tubular with a tapering on its outer surface such that it is shaped like part of the surface of a cone.

The split ring 202 preferably has interlocking fingers 203 at each end of the collar, as shown in FIGS. 1D and 1E. However, embodiments also include the split being a linear slot and there being no interlocking between the two ends of the collar 202. On the inner surface of the split ring collar 202 teeth are provided. The teeth are one or more raised ridges provided on the inner surface that extend around the entire inner circumference of the split ring collar. As can be seen in at least FIGS. 2D and 2E, at the narrower diameter end of the outer surface of the split ring collar, one or more ridged groves/raised ridges are provided on the outer surface of the split ring collar around the entire outer circumference of the split ring collar.

The sleeve 200 is shown on its own in FIGS. 2A and 2B. A cross section of a wall 201 of the sleeve 200 is shown in FIG. 2C. The sleeve 200 is substantially tubular. An end section of the wall 201 of the sleeve 200 is tapered along the longitudinal axis of the sleeve 200 and is therefore shaped like part of the surface of a cone. The tapering is shown in FIG. 2C where the tapering of the sleeve 200 causes one end of the sleeve wall 201 to be thicker than the other. As clearly shown in at least FIGS. 2A and 2B, a portion of the inner surface of the sleeve has a plurality of ridged groves/raised ridges that extend around the inner circumference of the sleeve 200.

To attach the stop collar to a pipe, the split ring collar and the sleeve are slid over the end of a pipe and then the split ring collar is press fitted into the sleeve. The split ring collar and the sleeve are positioned on the pipe such that the end of the split ring collar with the narrower outer diameter is forced into the end of the sleeve with the larger inner diameter. As the split ring collar is pressed into the sleeve, the conical inner surface of the sleeve causes the split ring to close and the teeth on the inner surface of the split ring collar to grip the pipe.

The length and configuration of the split collar and sleeve are such that after the split ring collar has been pressed into the sleeve, the sleeve encircles part of the split ring collar but not all of the split ring collar. Advantageously, the tool that forces the split ring collar and sleeve together can directly act on the end faces of the both the split ring collar and the sleeve.

The ridged groves/raised ridges on the outer surface of the split ring collar and the ridged grooves/raised ridges on the inner surface of the sleeve interact with each other to provide a ratchet that holds the split ring collar in the position that it has been pressed into the sleeve. The gripping of the pipe by the split ring collar is maintained by the ratchet.

An advantage of the split ring collar of the present embodiment is that the stop collar can be attached to a pipe by only pressing the split ring collar and the sleeve together. No pins, screws or welding are required to attach the stop collar to the pipe. In addition, the pipe diameter that the stop collar can be attached to can be within a relatively wide tolerance range as the variable inner circumference of the split ring collar allows the stop collar to be easily attached to pipes with differing outer diameters. The gripping force against the pipe can also be easily controlled to a high level by the force used to push the two parts of the stop collar together. Further advantages include the simple and low cost of the construction of the stop collar.

A known type of stop collar is manufactured by Ace Oil Tools and referred to herein as the Ace stop collar. The Ace stop collar is a two part stop collar in which a male part is pressed into a female part. The female part is a sleeve substantially as described above for the second embodiment. The male part is differs from the above-described second embodiment both because the male part comprises a plurality of fingers and the male part also does not comprise a split ring. The Ace collar is also functionally different from the stop collar of the above described second embodiment. When the male and female parts of the Ace stop collar are pressed together, the fingers of the male part are bent inwards and it is this bending movement that causes the ends of the fingers to grip the pipe. Details of the Ace stop collar can be found at https://www.aceoiltools.no/, as viewed on 6 Apr. 2017.

According to a third embodiment, the known fingered Ace stop collar is adapted so that the male part of the Ace stop collar comprises a split ring.

The stop collar of the third embodiment is a two part stop collar in which a male part is pressed into a female part. The female part is a sleeve as described above for the second embodiment, including the ridged grooves/raised ridges on its inner surface for forming a ratchet. The male part is a split ring collar as described for the second embodiment but differs by having a plurality of slots cut into the split ring collar. Each slot is the same length, aligned along the longitudinal axis of the collar and starts at the end of the collar with the narrower outer diameter. The region between any two adjacent slots is a finger and the male part of the third embodiment comprises a plurality of fingers. The male part differs from the male part of the Ace stop collar due to the split ring, which preferably has interlocking fingers substantially as shown in FIG. 2E for the second embodiment. The split ring may also be a linear slot.

To attach the stop collar of the present embodiment to a pipe, the fingered split ring collar and the sleeve are slid over the end of a pipe and then the fingered split ring collar is forced into the sleeve. The fingered split ring collar and the sleeve are positioned on the pipe such that the end of the fingered split ring collar with the narrower outer diameter is pressed into the end of the sleeve with the larger inner diameter. As the fingered split ring collar is pressed into the sleeve, the tapered inner surface of the sleeve causes both the split ring to close and/or the fingers to bend radially inwards so that the teeth of the fingered split ring collar grip the pipe.

Advantageously, stop collar of the present embodiment can be attached to a pipe by only pressing the fingered split ring collar into the sleeve. No pins, screws or welding are required to attach the stop collar to the pipe. In addition, the pipe diameter that the stop collar can be attached to can be within a relatively wide tolerance range as the variable inner circumference of the split ring collar allows the stop collar to be easily attached to pipes with differing outer diameters. In addition, the attachment of the fingered split ring collar to the pipe is due to the bending of the fingers and/or the closing of the split ring. In addition to flexible use of the stop collar, this allows a very strong gripping force applied to the pipe. Further advantages include the simple and low cost of the construction of the stop collar.

The second and third embodiments also include a number of modifications and variations to the stop collars as described above.

The split ring collar, and the fingered split ring collar, may also be provided without teeth on their inner surface. Although the use of teeth aids the gripping of the pipe, by not having teeth damage to the pipe by the teeth is avoided.

The stop collars according to the above-described embodiments are attached to a pipe by the male and female parts of the stop collar being slid over the end of a pipe and then the male and female parts being forced together. Accordingly, the stop collars can only be attached to a pipe, or a section of pipe, when the end of the pipe is accessible.

According to fourth and fifth embodiments, the stop collars according to the above-described embodiments are adapted so that the stop collars are still attachable to a pipe when there is no access to an end of the pipe. It should be noted that being able to attach a stop collar to a pipe according to the techniques of the fourth and fifth embodiments is advantageous even when an end of the pipe is accessible as it allows more efficient preparation of a completion string.

Figure 3A:
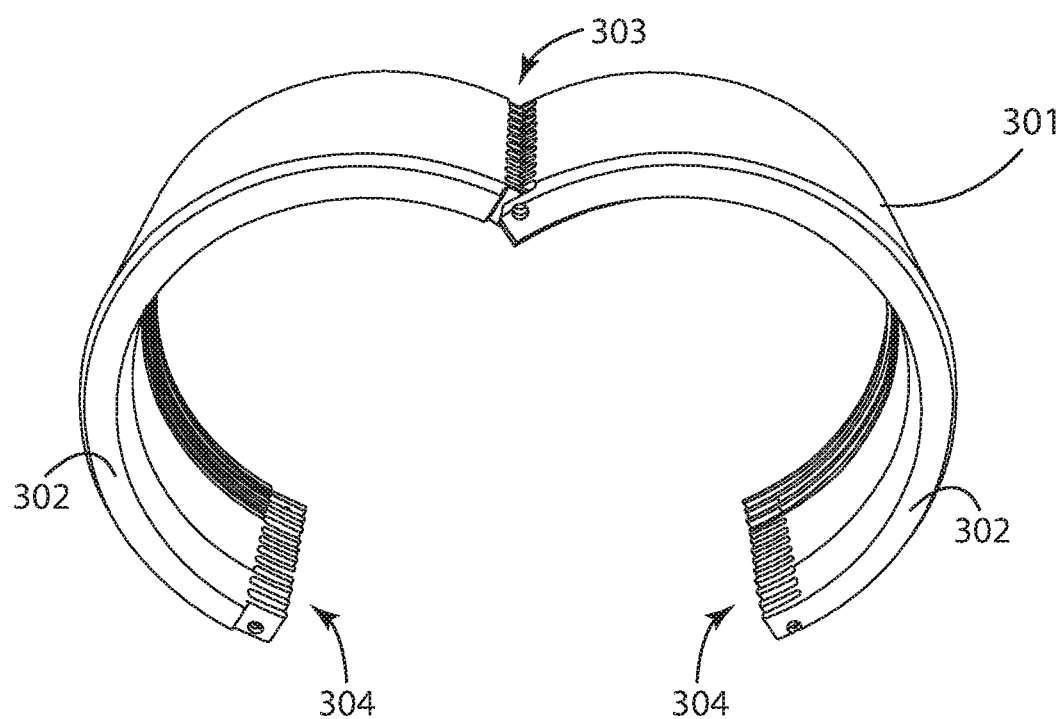
FIGS. 3A and 3B show a stop collar component according to an embodiment.
Figure 3B:
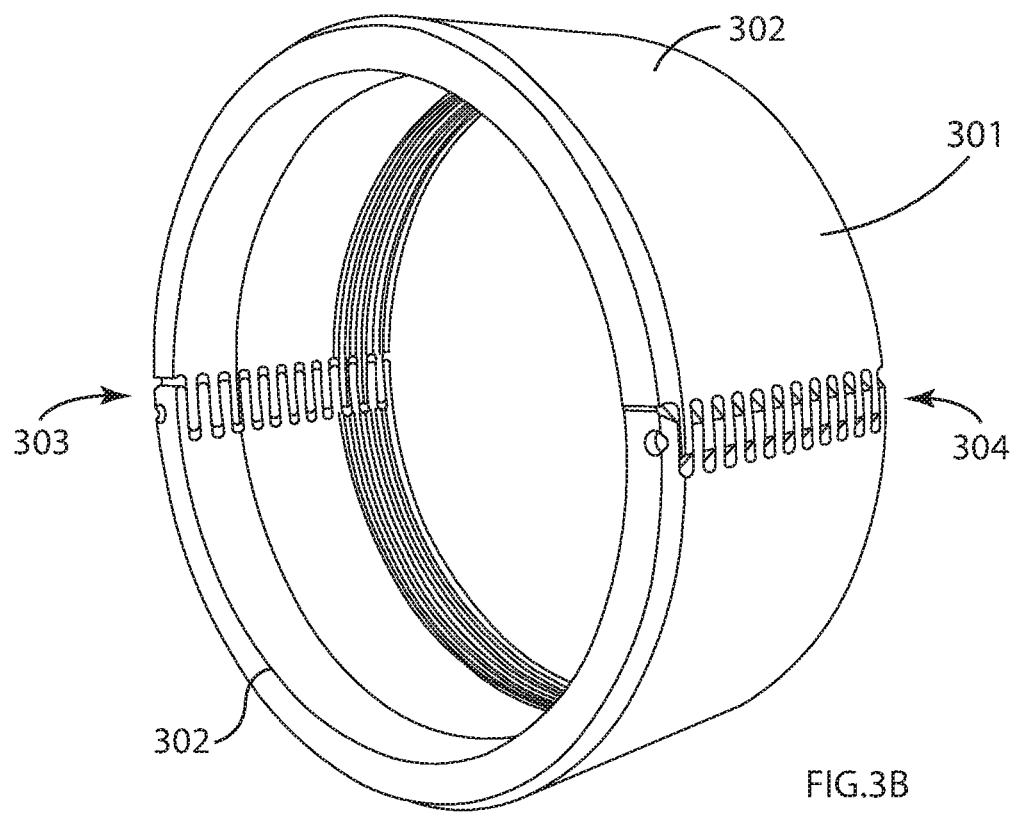

According to a fourth embodiment, the male and/or female parts of any of the stop collars according to the first to third embodiments are hinged. FIGS. 3A and 3B show the sleeve 301 according to the second or third embodiments adapted according to the fourth embodiment. One end of each half 302 of the sleeve 301 is hinged 303 and the other end of each half 302 of the sleeve preferably comprises interlocking parts 304 as shown in FIGS. 3A and 3B. When the hinged 303 parts 302 are closed together, as shown in FIG. 3B, the hinged 303 parts 302 may be held together by a number of techniques. These include inserting a rod or screw through holes in interlocking parts. If necessary, the rod or screw may be held in place by adhesive, welding or other techniques. The two halves 302 of the stop collar may alternatively be welded together.

The male part of the stop collar is as described in any of the first to third embodiments and adapted in the same way as the female part so that male part of the stop collar comprises a hinge. Preferably the hinge is diametrically opposite the split in the male part. Unlike the female part of the stop collar, it is not necessary for the hinged parts of the male part to be attached together at both ends. The two parts of the male part may be attached only by the hinge or there may be no attachment between the two parts of the male part.

Figure 4:
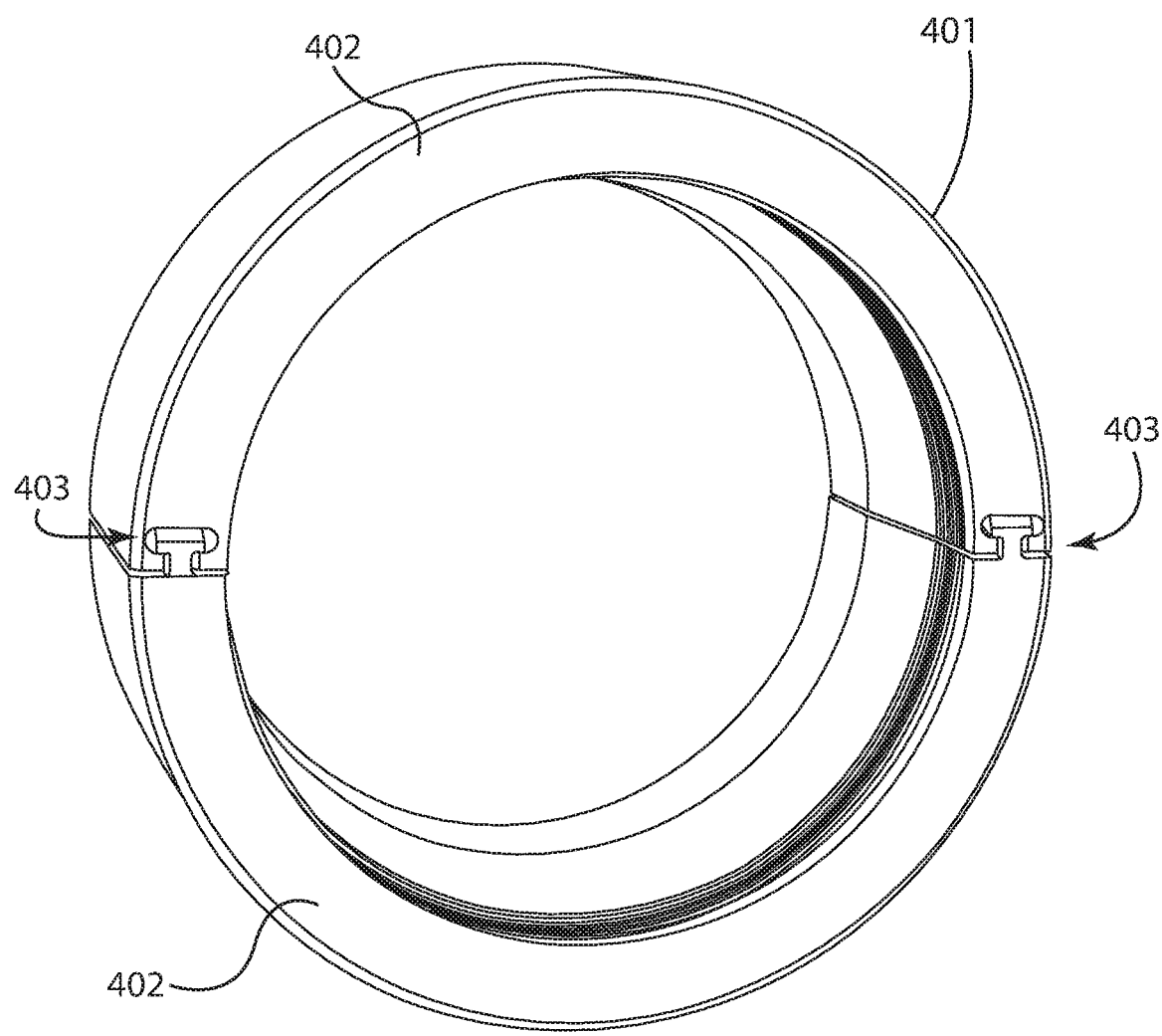
FIG. 4 shows a stop collar component according to an embodiment.

According to a fifth embodiment, the female part of the stop collar according to any of the first to third embodiments comprises two separate parts that are not hinged together. FIG. 4 shows the sleeve 401 according to the second or third embodiments with the two halves 402 of the stop collar connected together by a sliding dovetail joint 403. The fifth embodiment includes other types of joints being used.

Preferably, the two parts of the sleeve are not fixed together prior to the male part of the stop collar being inserted into the sleeve and are able to slide relative to other axially. The two parts of the sleeve are instead fixed together by the action of forcing the male part into the sleeve to attach the male part of the stop collar to the pipe. The press fit results in the male part exerting a radially outwards force against the sleeve and this holds the two parts of the sleeve together. Advantageously, no welding or other technique is required to hold the two parts of the stop collar together.

Alternatively, the two parts of the sleeve may be attached together by using welding, adhesive or any other technique.

According to the fifth embodiment, the male part of the stop collar is as described of any of the first to third embodiments but also comprised by two separate parts. The separate parts may be connectable through a sliding joint, as described for the sleeve of the fifth embodiment, or they may be designed to be used next to each other but not connected together. Preferably the two male parts of the stop collar correspond to the male part of any of the first to third embodiments being divided at a position diametrically opposite the split in the male part.

Preferably, the two halves 402 of the male part are not fixed together and are instead held in position by the action of press fitting the male parts of the stop collar into the female parts. The radial forces that result from the press fit hold the male and female parts of the stop collar in the desired position.

Alternatively, the two halves 402 of the male part may be fixed together by using welding, adhesive or any other technique.

Embodiments also include the male or female part of the stop collar being according to either of the fourth and fifth embodiments with the other part of the stop collar being according to any of the first to third embodiments.

Embodiments also include the male part of a stop collar according to the fourth embodiment being used with the female part of a stop collar according to the fifth embodiment. Similarly, embodiments also include the female part of a stop collar according to the fourth embodiment being used with the male part of a stop collar according to the fifth embodiment.

The male and female parts of the stop collars according to the fourth and fifth embodiments are each not restricted to comprising only parts as shown in FIG. 3A, FIG. 3B and FIG. 4. Each of the male and female parts may alternatively comprise more than two parts The techniques of the fourth and fifth embodiments are also applicable to all other stop collar designs. In particular, embodiments include adapting the Ace stop collar so that each of the male and/or female parts of the stop collar comprise to or more parts as described for the fourth and fifth embodiments.

According to a sixth embodiment, there is provided a stop collar that is adapted so that it supports the provision of a function element around a pipe. Examples of function elements are centralisers for ensuring that the pipe is correctly positioned within a drilled hole and elements for supporting cables and tracers. The sixth embodiment is described below with the adaption of the Ace stop collar to support a function element.

Figure 5A:
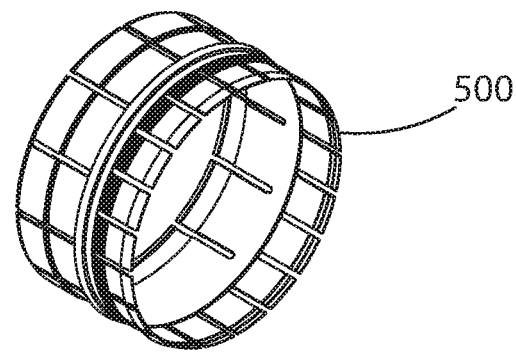
FIGS. 5A, 5B, 5C, 5D, 5E, 5F and 5G show a stop collar component, band component and/or function element component according to an embodiment.
Figure 5B:
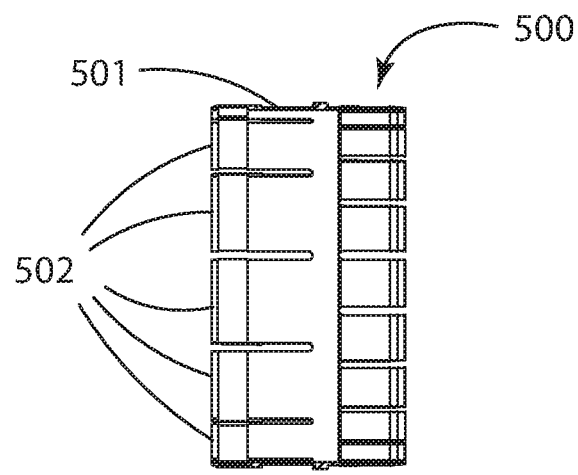

FIGS. 5A and 5B show the male part 500 of the Ace stop collar adapted to support a function element. The right hand end of the male part of the stop collar as shown in FIGS. 5A and 5B comprises a plurality of fingers that are the fingers of the known Ace stop collar and interface with the female part of the stop collar. The adaption to the male part of the stop collar so that it can support a centraliser according to the present embodiment is shown on the left hand end 501 of the male part 500. The adaption is to provide a plurality of fingers 502 at the end 501 of the male part that interface with the function element. The fingers 502 are created by providing a plurality of equal length, linear and axially aligned slots from the left hand end 501 of the male part. A finger 502 is formed between any two adjacent slots. Each of the fingers 502 extends axially from a body of the male part 500.

Figure 5C:
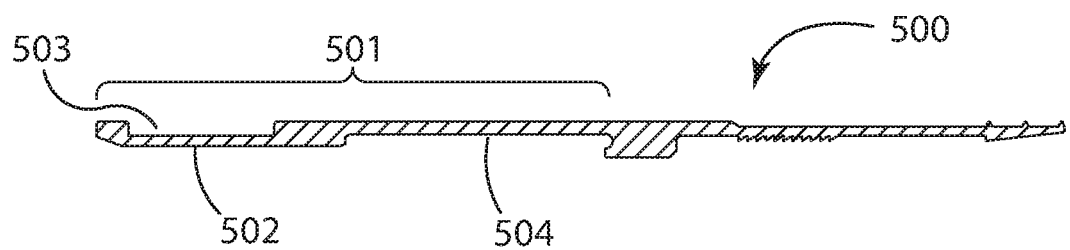

FIG. 5C shows a cross section of the wall of the male part 500 of the stop collar with the upper side of the cross section corresponding to the inner surface of the male part and the lower side of the cross section corresponding to the outer surface of the male part. The right hand end of the male part comprises teeth on the upper surface for gripping a pipe and ridges on the lower surface for forming a ratchet with the sleeve. These features are as for the known Ace stop collar product and are for attaching the male part to the pipe and the male part to the female part of the stop collar, i.e. a sleeve. Shown on the left hand side of FIG. 5C is a cross section of one of the plurality of fingers 502 for supporting a function element. The finger is shaped so that there is a first recess 503 on the inner surface of the finger close to the end 501 the male part that interfaces with the function element. There is also a second recess 504 provided on the outer surface of the finger and/or body of the male part 501 that is positioned between the first recess and the end of the male part that interfaces with the female part. All of the fingers 502 for supporting a function element are elastically bendable and can be deflected radially inwards.

Figure 5D:
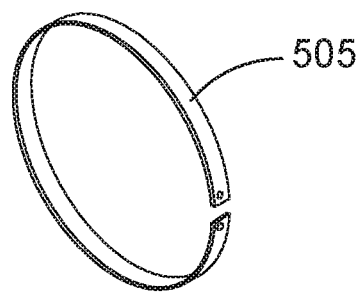
Figure 5E:
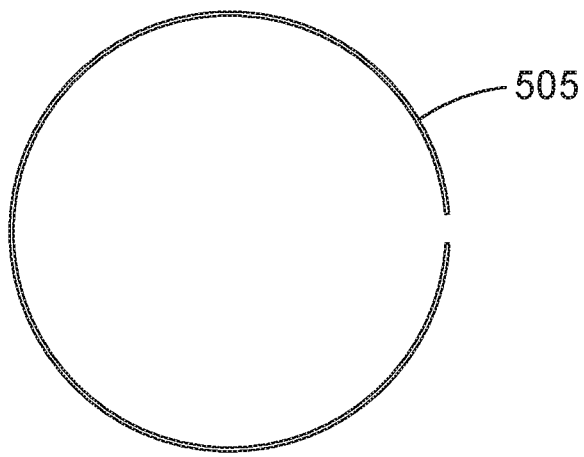

FIGS. 5D and 5E show a split ring band 505 according to the present embodiment. The band is shaped so that in fits within the first recess 503 on the inner surface of the fingers 502 of the male part at the end the male part that interfaces with the function element. The split ring band 505 can be installed within the first recess by reducing the outer diameter of the split ring by closing the split ring, positioning the split ring within the male part where the first recess 503 is located and then opening the split ring to increase the outer diameter of the split ring band. When the split ring band is positioned within the male part, the diameter of the wall of the split ring band is preferably the same, or less, than the depth of the first recess so that there is no substantial increase in the minimum inner diameter of the male part.

Figure 5F:
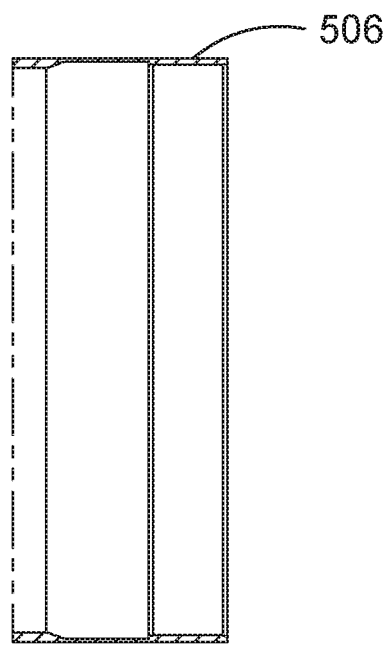
Figure 5G:
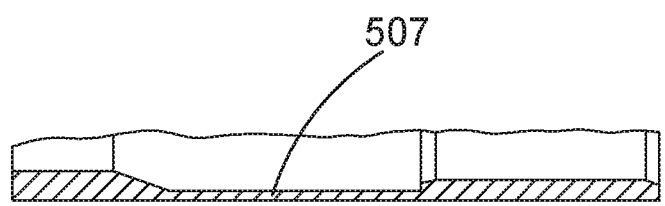

FIG. 5F is a cross section of an end of a function element 506 that interfaces with the male part 501 of a stop collar according to the present embodiment. FIG. 5G is a cross section of a wall of the end part of the function element 506 with the upper side in FIG. 5G corresponding to the inner surface of the end of the function element 506. The inner surface of the end of the function element 506 comprises a single recess 507, or hole, in its inner surface, the recess 507 extending around the entire inner circumference of the end of the function element 506. The effect of the recess 507 is that the inner diameter of the end of the function element 506 is larger in the recess than between the recess and the tip of the end of the function element 506 that interfaces with the male part of the stop collar. The recess 507 preferably has a corresponding shape to the outer profile of the fingers 502 of the male part 500 of the stop collar that interface with the function element such that it can receive the fingers 502.

In use, the male part of the stop collar is connected to the function element prior to either the function element or the male part of the stop collar being positioned around a pipe. The male part of the stop collar is aligned axially with the function element with the end of the male part for supporting a function element facing the end of the function element for connecting to the male part of the stop collar. The split ring band is not installed within the first recess of the male part of the stop collar at this stage. The function element and male part are then forced together. The pressing of the male part into the end of the function element causes the fingers of the male part to bend, or deflect, radially inwards as the ends of the fingers meet and then are moved into the end of the function element. On continued pressing of the male part into the function element, the start of the second recess on the outer surface of each finger of the male part reaches the start of the recess on the inner surface of the end of the function element. Due their elasticity, the fingers of the male part then return to substantially their position prior to being inserted into the function element so that they are no longer bent or deflected. The male part is then connected to the function element with the raised outer surface at the end of each of the fingers retained within a recess on the inner surface of an end of the function element.

Preferably, the split ring band is then inserted into the first recess in the inner surface of the fingers of the male part as described above.

After the function element has been connected as described above to the male part of a stop collar the function element can be attached to a pipe by sliding the female part of the stop collar over the end of the pipe, sliding the function element together with the connected male part over the end of the pipe and then attaching the male part to the pipe by press fitting the female and male parts of the stop collar together to thereby attach the stop collar to the pipe.

Advantageously, a function element that does not comprise integral components for connecting the function element to a pipe can be attached to a pipe by first connecting the function element to a stop collar. This increases the flexibility of construction of the function element as well as the flexibility in connecting the function element to a pipe.

Embodiments include the function element and male part being connected together both with and without a split ring band being installed within the first recess of each of the fingers of the male part of the stop collar. Preferably the split ring band is installed after the male part is connected to the function element and before the male part and function element are slid onto a pipe. The first recess in each of the fingers advantageously increases the flexibility of the fingers and aids the connection of the fingers to the function element. Installing the split ring band after the function element and male part have been connected together advantageously decreases the flexibility of the fingers and therefore increases the strength of the connection between the male part of the stop collar and the function element when the function element is connected to a pipe by the stop collar.

After the function element has been attached to a pipe, the axial and rotational movement of the function element relative to the pipe is determined by the relative arrangement of the fingers of the male part for supporting the function element and how the function element is configured to receive the fingers of the male part. The function element as shown in FIGS. 5F and 5G comprises a single recess round the entire inner circumference of one of its ends into which the raised ends of a plurality of fingers of the male part of the stop collar are retained. Rotation of the function element relative to the stop collar is consequently unrestricted. The axial movement of the function element along the length of the pipe is determined by how the length of the raised outer surface of the end of each finger corresponds to the length of the recess of the inner surface of the end of the function element as well as the how the axial length of the end of the function element between the recess on its inner surface and the tip of the function element corresponds to the axial length of the second recess on the outer surface of the male part. Preferably the length of one, or both, of the inner recess of the function element and the second recess of the male part is substantially the same as the length of what is retained within the recess when the function element is connected to the male part. Substantially no axial movement of the function element along the length of the pipe is therefore possible.

Figure 6:
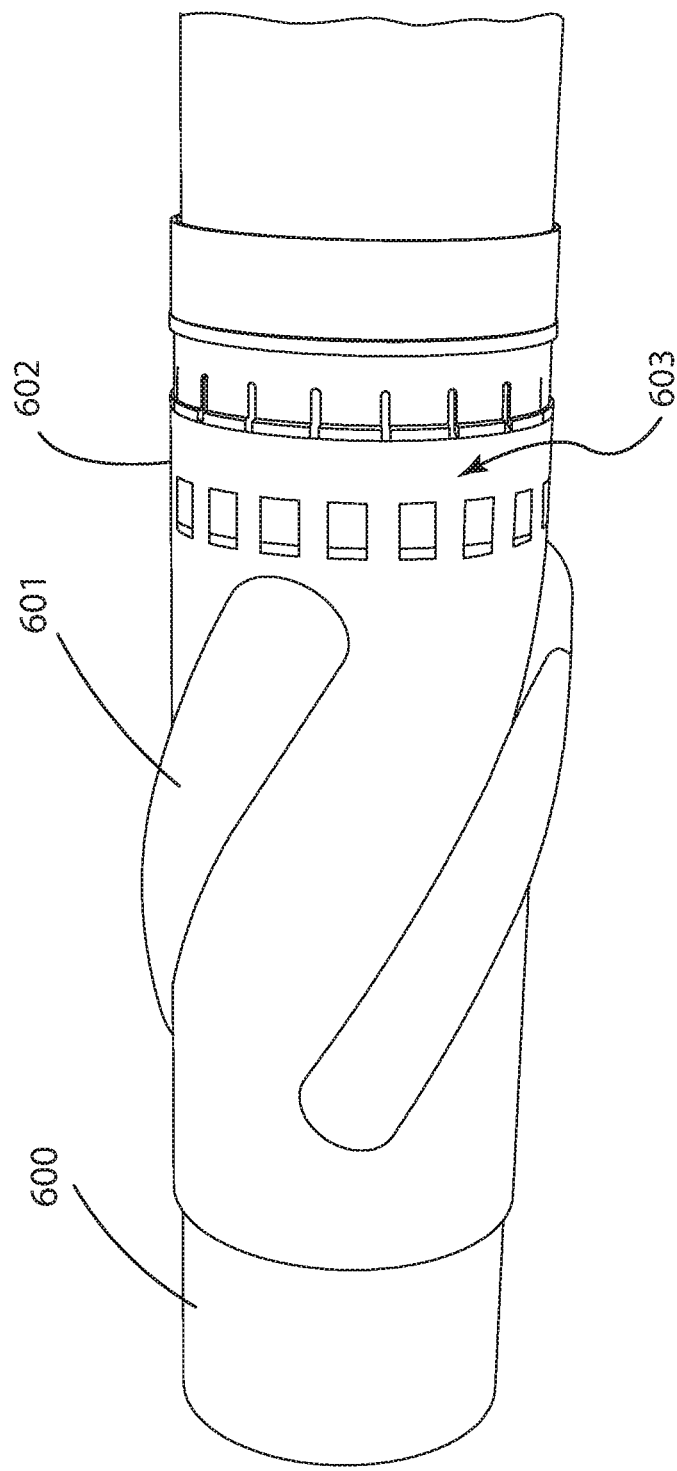
FIG. 6 shows an embodiment.

FIG. 6 shows an alternative design of function element 601 according to the present embodiment. The end of the function element 601 differs from that shown in FIGS. 5F and 5G by not having a single recess in the inner surface of the end of the function element and instead having a plurality of holes 603. As shown in FIG. 6, the holes extend all the way through the wall of the function element however embodiments also include the holes 603 not extending all the way through the wall of the function element 601. The retention of the raised portion of each of the fingers of the male part in a hole prevents the rotation of the function element relative to the male part of the stop collar.

Whether or not it is desirable for a function element 601 to that is connected to a pipe 600 to be able to rotate relative to the pipe 600 and/or have substantial axial movement along the pipe 600 depends of the application of the function element as well as the type and design of function element 601. The rotational capability and axial movement of the function element 601 are both controllable through appropriate selection of the interface between the function element and male part of the stop collar.

The sixth embodiment is not restricted to a function element connecting to a male part of a stop collar as described above. The embodiment may alternatively be implemented by connecting a function element to a female part of a stop collar. In such an implementation, the stop collar is alternatively designed so that the male part of the stop collar is unchanged from that of a stop collar that is not designed to support a function element. However, the female part of the stop collar is instead adapted so that one end of it comprises a plurality of fingers that connect to the function element as described above for a male part. The function element is therefore connected to the female part of the stop collar, and optionally the split ring band installed under the fingers of the female part, prior to the female part being provided on a pipe. The function element and female part are then slid over the end of a pipe and the female part of the stop collar is press fitted together with a male part in order to attach the stop collar to the pipe.

Embodiments include the part of the stop collar that attaches to the function element being either the male part or the female part of any of the stop collars according to the embodiments described herein, in particular the first to third embodiments.

Embodiments also include any other type of stop collar being adapted to comprise fingers for supporting a function element as described above. The stop collars are not restricted to being two part stop collars and may be a single part stop collar that is attached to a pipe by welding or other techniques.

The function elements may be any components that it is desirable to attach to the outside of a pipe. These include any type of centraliser such as the solid centraliser, as shown in FIG. 6, and bow string centralisers.

A particularly advantageous implementation according to embodiments is in the application of attaching one or more centralisers to pipes that are being lowered into a drilled hole in the oil and gas industry. The stop collar that connects the centraliser to the pipe is preferably provided below the centraliser so that the stop collar pulls the centraliser along as the pipe is lowered into a drilled hole. The pulling action stretches the centraliser and significantly reduces the likelihood of the centraliser being deformed into a damaged state or a substantial increase in force being required in order to pass the centraliser through a narrow part of the hole. If the centraliser is instead pushed through the hole by a stop collar above the centraliser, as occurs in the configuration described in the background section of the present document, the pushing of the centraliser results in the centraliser being compressed, instead of stretched, and this can damage the centraliser and deform the centraliser into a shape that increases its outer diameter and makes passing the centraliser through the hole more difficult.

Preferably, both ends of a centraliser are connected to a stop collar as described for the sixth embodiment. This increases the strength of the connection between the function element and the pipe. In addition, the connections between the function element and each of the stop collars allow the function element to be both pulled into and pulled out of a hole if a pipe that has been lowered into the hole is later pulled out of the hole.

The sixth embodiment is described above with reference to the end of a function element, as shown in FIG. 5F. Embodiments also include there being a mid-piece in between the part of the stop collar and the function element. In such embodiments, an end of the mid-piece is instead adapted as shown in FIG. 5F and the stop collar part supports the mid-piece in a corresponding way to how the male part of a stop collar is described as supporting a function element in the above-described sixth embodiment. The interface between the mid-piece and the function element may be according to any known technique, or the ends of the function element and mid-piece may also be adapted so that the mid-piece supports the function element as described for the sixth embodiment.

The mid-piece is itself a function element that is intermediate to a further function element. For example, the mid-piece may be a collar around the pipe between a centraliser and stop collar. Preferably the mid-piece can rotate relative to both the centraliser and the stop collar as this can reduce the frictional wear on the stop collar and the centraliser.

In the sixth embodiment as described above, the ends of the fingers of the male part of a stop collar deflect radially inwards when the male part of the stop collar is attached to the function element and the end of the function element encircles the end of the male part of the stop collar. Embodiments also include the fingers of the male part being configured to deflect radially outwards when the male part of the stop collar is attached to the function element so that the function element is encircled by the end of the male part of the stop collar. An advantage of this embodiment is that it is possible to connect the function element and the stop collar part when both the function element and the stop collar part are already provided around a pipe.

In the sixth embodiment as described above, the stop collar part is fingered and the end of the function element comprises one or more holes for receiving the fingers. Embodiments also include the alternative arrangement of the end of the function element being fingered and the end of the stop collar part comprising one or more holes for receiving the fingers. The end of the function element would therefore be substantially as how the end of the stop collar part is described in the sixth embodiment, and the end of the stop collar part would be substantially as how the end of the function element is described in the sixth embodiment.

Figure 7:
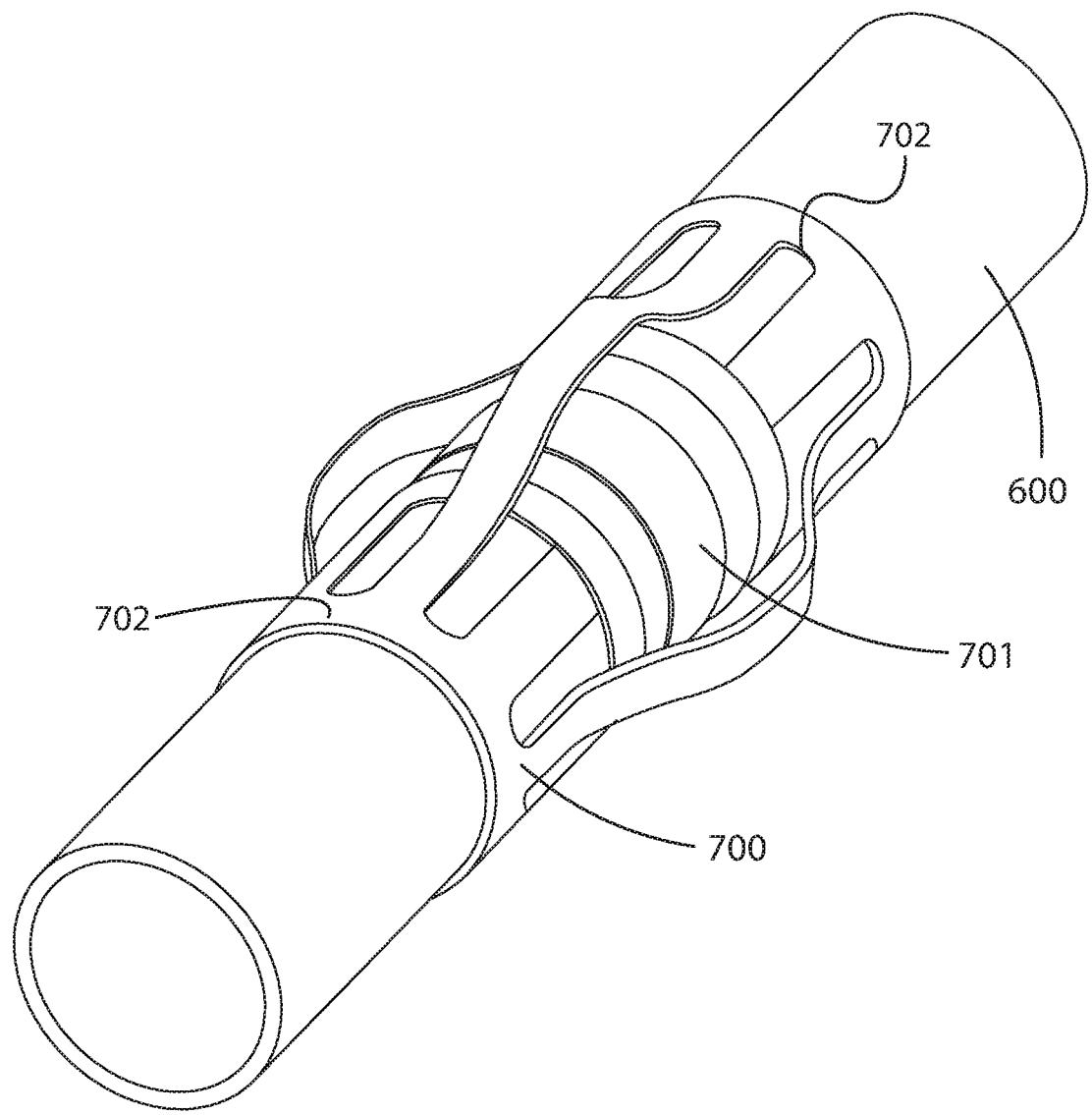
FIG. 7 shows an embodiment.

In the sixth embodiment as described above, a part of a stop collar is connected to one of the ends of an elongate function element. Embodiments also include an end part of a stop collar being connected to a mid-part of the function element. That is to say, the part of the function element that connects to the stop collar is not located at one of the ends of the function element but instead located between the ends, and preferably at the mid-point between the two ends of the function element. In use with the function element attached to a pipe by a stop collar, the function element extends over the stop collar, along the longitudinal axis of the pipe, so that the stop collar is positioned between the two ends of the function element. The function element may be a centraliser substantially as shown in FIG. 7, but with the centraliser modified so that a stop collar can be connected to the mid-point of the centraliser. Advantageously, the present embodiment allows a single stop collar to pull a function element both into a hole and out of a hole.

According to a seventh embodiment, when in use, a function element is supported on a pipe by a stop collar as described for the sixth embodiment and the variants thereof. The seventh embodiment differs from the sixth embodiment by the way in which the function element is attached to the stop collar. In the sixth embodiment, a stop collar part is connected to a function element prior to the function element being positioned on a pipe. According to the seventh embodiment, the function element is connected to the stop collar after the stop collar has been attached to the pipe.

The stop collar according to the present embodiment is adapted as described for the sixth embodiment so that at least one end of the stop collar is capable of supporting a function element. The end of the stop collar that supports the function element may be fingered, as described for the sixth embodiment, or it may not be fingered. If the end of the stop collar is not fingered, then it would still comprise a recess all around the circumference of its outer surface, with the recess corresponding to the second recess as described on the outer surface each of the fingers in the sixth embodiment. The stop collar may be attached to a pipe according to any of the techniques for attaching a stop collar to a pipe described in the present document, or according to known techniques.

The function element according to the present embodiment differs from that of the sixth embodiment by being provided around a pipe by wrapping the function element around the pipe. For example, the function element may be a centraliser that substantially has the form of a plate when it is supplied to a place of use. The centraliser, which may be heated, is then wrapped around the outer circumference of a pipe so that it substantially has the form of an elongate tube. By attaching the sides of the centraliser to together a substantially tubular centraliser is provided around the pipe. The sides of the centraliser may be welded together, attached by a jigsaw mechanism or other techniques.

When provided around a pipe, the function element is substantially as described for the sixth embodiment, and variants thereof. That is to say, a part of the function element is adapted so that it can be supported by an end of a stop collar. The part of the function element therefore comprises one of more holes, or recesses, such as those shown for the function element in any of FIG. 5F, FIG. 5G and FIG. 6.

According to the present embodiment, a stop collar for supporting a function is first attached to a pipe. The function element is then connected to the stop collar by wrapping the function element around the pipe with the part of the function element that is supported by the stop collar being wrapped around the part of the stop collar for supporting the function element. The sides of the function element are then permanently welded, or otherwise attached to each other, so that the function element maintains its shape and connection to the stop collar. Preferably, the function element is still able to rotate relative to the stop collar and pipe.

The seventh embodiment provides the same advantageous support of a function element on a pipe as described for the sixth embodiment. In particular, the function element is pulled along when a pipe is lowered into a hole. In addition, the function element may be provided around a pipe without access to the end of the pipe being required.

According to an eighth embodiment, there is provided function element that is connected to a pipe. The movement of the function element along the longitudinal axis of the pipe is restricted, or prevented, but advantageously the function element is pulled along when it is at least lowered in to a hole. Preferably, the function element may also rotate relative to the pipe. The function element may be any of the function elements described in the present document, in particular a centraliser.

A possible implementation of the eighth embodiment is shown in FIG. 7. According to the eighth embodiment, a function element 700 is designed so that, when positioned on a pipe 600, the inner surface of each end 702 of the function element 700 is substantially flush with the outer surface of the pipe 600. The ends 702 of the function element are therefore unable to pass over any substantial obstruction 701 on the outer surface of the pipe 600. In a mid-part of the function element 700 there is provided a one or more holes, or recesses, such that this part of the function element is able to receive a stop collar or other obstruction on the outer surface of the pipe 600.

After the function element 700 has been provided on a pipe 600, a substantial obstruction 701 is provided in the one or more holes, or recesses, in the mid-part of the function element 700. The obstruction 701 may be any stop collar design that is attachable to the pipe without requiring the stop collar to be slid over the end of the pipe. Alternatively, a stop collar that does require one or more of its parts to be slid over the end of a pipe may be used. The stop collar would be positioned within the mid-part of the function element prior to the function element 700 being slid over the end of the pipe 600 and then over the end of the pipe. Alternatively, the obstruction 701 may be created by any of welding, spraying/supplying a substance that hardens, or moulding a substance around the outer circumference of the pipe in the mid part of the function element 700.

The substantial obstruction 701 restricts the axial movement of the function element along the pipe as neither end 702 of the function element 700 is able to pass over the obstruction 701 in the mid mart of the function element 700. The function element 700 is still able to rotate relative to the pipe 600. Advantageously, the function element 700 is pulled along when a pipe 600 is lowered into a hole.

In an alternative implementation of the eighth embodiment, a part of a function element has a hole, or recess, on its inner surface. The recess extends all around the circumference of the inner surface of the function element. The recess substantially corresponds to the recess in the part of the function element as shown in either of FIG. 5F and FIG. 5G. The part of the function element also comprises a hole through its surface that extends from the outer surface of the function element to the recess in the inner surface. The function element is positioned on a pipe and a weld, spray or other supply of hardening substance is provided through the hole. The function element and/or pipe are rotated as the supply of hardening substance is made such that a hardening substance is provided around the entire outer circumference of the pipe within the recess. After the substance has hardened, the axial movement of the function element along the pipe is restricted by the part of the function element with the recess being unable to move axially over the hardened substance on the outer surface of the pipe. The function element may still be able to rotate relative to the pipe.

According to a ninth embodiment, there is also provided function element that is connected to a pipe. The movement of the function element along the longitudinal axis of the pipe is restricted, or prevented, but advantageously the function element is pulled along when it is at least lowered in to a hole. Preferably, the function element may also still rotate relative to the pipe. The function element may be any of the function elements described in the present document, in particular a centraliser.

Function element according to the ninth embodiment is substantially tubular with an increased inner diameter at an end part of the function element. The increased inner diameter extends from the tip of the end part into the function element so that, when the function element is positioned on a pipe, there is an axial length of the end part of the function element that is radially spaced apart from the outer surface of the pipe.

A substantial obstruction is provided on the outer surface of the pipe that increases the outer diameter of the pipe. The obstruction may be a stop collar. Alternatively, the obstruction may be created by any of welding, spraying/supplying a substance that hardens, or moulding a substance around the outer circumference of the pipe. The maximum outer diameter of the substantial obstruction is less than the minimum inner diameter of the end part of the function element but greater than the minimum inner diameter of at least one other part of the function element.

To attach the function element to a pipe, the end part of the function element is slid over the substantial obstruction. A retaining ring is then placed on, or attached to, the end of the end part of the function element. The retaining ring provides a region of reduced inner diameter. The retaining ring may be attached directly onto the end of the end part of the function element. Alternatively, the retaining ring may not be directly attached to the function element but instead attached to the pipe next to end part of the function element.

The function element can then be attached to the end part either by welding or other techniques. The region of reduced inner diameter caused by the retaining ring is less than the maximum outer diameter of the substantial obstruction. The movement of the function element along the axis of the pipe is therefore restricted as the substantial obstruction is retained within the recess in the end part of the function element by the retaining ring.

Advantageously, the function element of ninth embodiment can be quickly and easily constructed and attached to a pipe.

In alternative to the ninth embodiment, the recess is provided in a mid-part of the function element and not an end part.

According to a tenth embodiment, a pipe is adapted to allow a new form of stop collar attachment.

The pipe has a grove in its outer surface. The groove may extend all around the outer circumference of the pipe. The groove is shallow and the depth of the grove is not so large that the width of the pipe wall at the groove is reduced to the extent that the integrity of the pipe is compromised. The groove in the pipe may be made when the pipe is manufactured. Alternatively, the pipe may be supplied to its place of use without a groove and the groove cut into the pipe on site.

The purpose of the groove is to receive part of a stop collar. The stop collar may be any design of stop collar capable of being received by the grove. The stop collar is preferably a single steel tubular band. The band is heated so that its inner diameter increases and then the band is slid over the end of the pipe and positioned over the groove. As the band cools, its inner diameter decreases and the band is attached to the pipe at the groove. Other techniques for attaching a band to the pipe at the groove are also possible.

Advantageously, the band has the effect of increasing the outer diameter of the pipe but the increase can be very small. This is particularly appropriate for applications in which it is the obstruction caused by a stop collar/band should be no more than necessary. An example of such a low tolerance application is when a plurality of co-axial pipes are provided with inner pipes inside an outer pipe.

In addition, the stop collar/band according to the present embodiment is also strong as it still has substantial wall thickness due to at least part of the wall of the band being within the groove on the outer surface of the pipe. The attachment of the stop collar to the pipe is also strong as the movement of the stop collar along the longitudinal axis of the pipe is prevented/restricted by the walls of the groove.

In an alternative implementation of the present embodiment, the groove does not extend all around the outer circumference of the pipe. There are instead provided one or move holes in the outer surface of the pipe which also may either be made when the pipe is manufactured cut into the pipe on site. The holes do not extend all the way through the pipe. The holes are instead shallow and the depth of each hole is not so large that the width of the pipe wall at the hole is reduced to the extent that the integrity of the pipe is compromised.

The stop collar may be any design of stop collar with one or more parts capable of being received by any of the one or more holes. The stop collar is preferably a single steel tubular band with one or more parts protruding from its inner surface that correspond to the location of the one or more holes in the outer surface of the pipe. The band may again be attached to the pipe by heating the band and positioning the one or more parts of the band over the one or more holes in the outer surface of the pipe so that the one or more parts are received by the one or more holes as the band cools. Other techniques for attaching a band to the one or more holes in the pipe are also possible.

Figure 8:
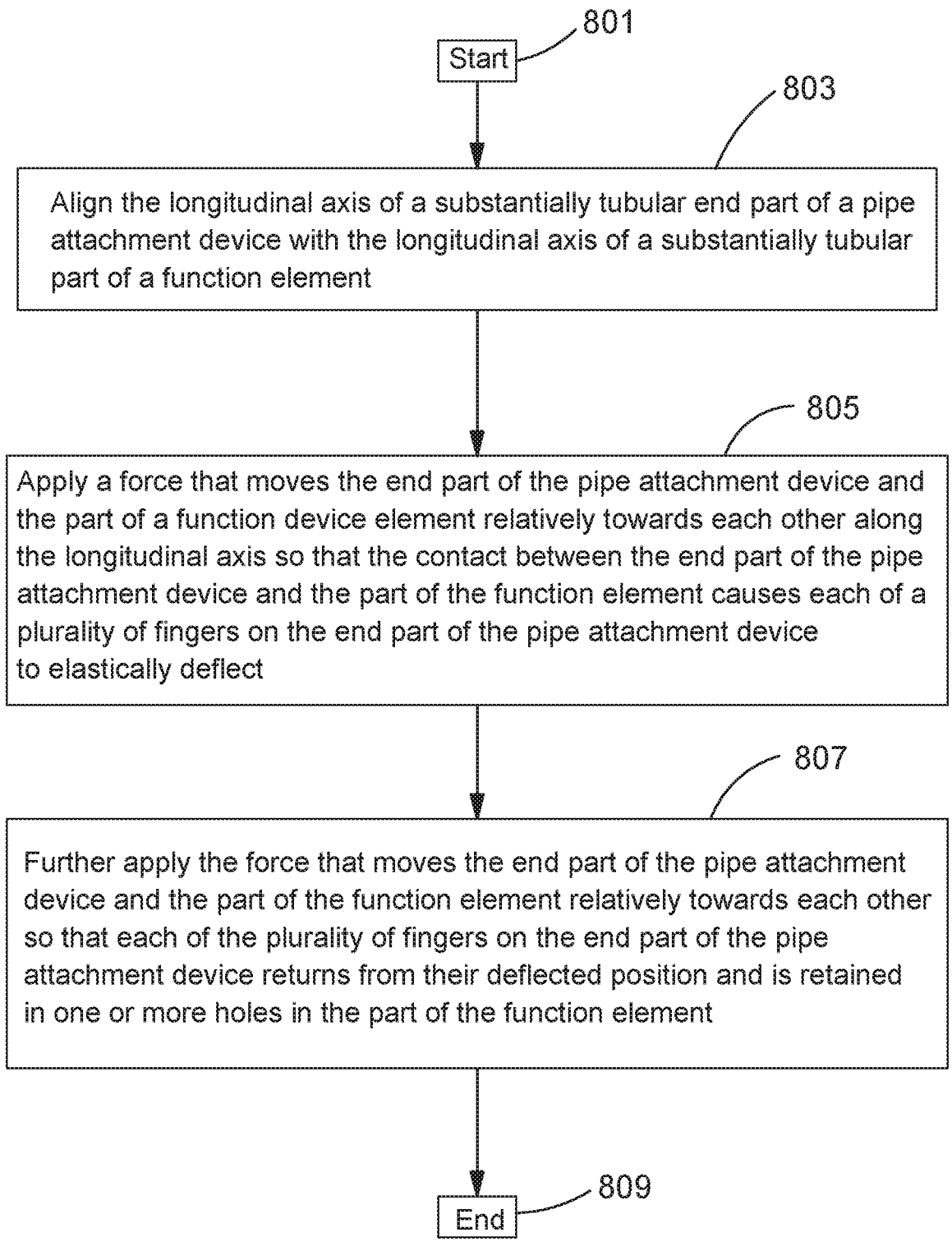
FIG. 8 is a flowchart according to an embodiment.

FIG. 8 is a flowchart of a process according to an embodiment.

In step 801, the process begins.

In step 803, the longitudinal axis of a substantially tubular end part of a pipe attachment device is aligned with the longitudinal axis of a substantially tubular part of a function element.

In step 805, a force is applied that moves the end part of the pipe attachment device and the part of the function element relatively towards each other along the longitudinal axis so that the contact between the end part of the pipe attachment device and the part of the function element causes each of a plurality of fingers on the end part of the pipe attachment device to elastically deflect.

In step 807, the force that moves the end part of the pipe attachment device and the part of the function element relatively towards each other is further applied so that each of the plurality of fingers on the end part of the pipe attachment device returns from their deflected position and is retained in one or more holes in the part of the function element.

In step 809, the process ends.

Embodiments include a number of modifications and variations to the embodiments as described above.

Embodiments include the female part of any of the stop collars according to the first to third embodiments being integrated with a function element.

The stop collars and function elements according to embodiments are suitable for industrial applications, in particular use in the subsea oil and gas industry. The stop collars and function elements may be made of any materials known for such applications, such as steel. In particular, the stop collar and function elements may be made of the same materials of the stop collars manufactured by Ace Oil Tools as shown on https://www.aceoiltools.no/, viewed on 6 Apr. 2017.

Embodiments also include the stop collars according to embodiments being adapted so that they can support function elements in other ways than the sixth embodiment. In particular, embodiments include the stop collars being adapted according to the techniques disclosed in WO2017/009440A1, the entire contents of which are incorporated herein by reference, so that a clamp can be press fitted onto the outer surface of the stop collar.

When forcing the male and female parts of a stop collar together, and a function element into a stop collar part, any of a number of known tools for press fitting tubular parts that are arranged around a pipe may be used. For example, the tool as shown in FIGS. 2 and 3 of U.S. Pat. No. 3,040,405 may be used, or any of the tools as disclosed on https://www.aceoiltools.no/, as viewed on 6 Apr. 2017, may be used.

Embodiments are particularly appropriate of the oil and gas industry, in particular for the preparation of drilled holes subsea in these industries. The dimensions of the components described herein are as required for the pipes and other devices used in these industries.

Additional embodiments of the invention are set out in the following eight examples.

Example Set 1

A method of connecting an end part of a pipe attachment device to a part of a function element includes aligning the longitudinal axis of a substantially tubular end part of a pipe attachment device with the longitudinal axis of a substantially tubular part of a function element. The method includes applying a force that moves the end part of the pipe attachment device and the part of the function element relatively towards each other along the longitudinal axis so that the contact between the end part of the pipe attachment device and the part of the function element causes each of a plurality of fingers on the end part of the pipe attachment device to elastically deflect. The method includes further applying the force that moves the end part of the pipe attachment device and the part of the function element relatively towards each other so that each of the plurality of fingers on the end part of the pipe attachment device returns from their deflected position and is retained in one or more holes in the part of the function element.

In an embodiment of the method the end part of the pipe attachment device comprises a plurality of axially aligned slots and the region between any two adjacent slots provides one of the plurality of fingers. In an embodiment of the method, a portion of the outer surface of each of the fingers is a ridge, and after each of the plurality of fingers has returned from the deflected position and is retained in one or more holes in the end of the function element, the ridge on the outer surface of each the fingers is retained within the one of the one or more holes in the inner surface of the function element. In a further embodiment of the method each of the plurality of fingers has a recess on its outer surface, after each of the plurality of fingers has returned from the deflected position, the inner surface of the end of the function element between the one or more holes in the inner surface of the end of the function element and the tip of the end of the function element is retained within the recesses on the outer surfaces of the plurality of fingers.

In an embodiment of the method each of the fingers comprises a recess in its inner surface. An embodiment of the method further comprises inserting a split ring band in the recesses of the plurality of fingers after the end part of the pipe attachment device has been connected to the end part of the tubular function element. In an embodiment of the method the one or more holes in the inner surface of the function element is a single recess in the inner surface and the function element is able to rotate relative to the end part of the pipe attachment device. In an embodiment of the method the retention of the ridge on the outer surface of each of the fingers in a respective hole on the inner surface of the function element substantially prevents relative rotation of the function element and the end part of the pipe attachment device.

An embodiment of the method further includes wherein each of the holes in the inner surface of the function element extends all the way through to the outer surface of the function element.

An embodiment of the method wherein the function element is a centraliser, such as a bow centraliser or a solid centraliser, or a mid-piece between the end part of the pipe attachment device and a centraliser. In embodiments of the method the end part of a pipe attachment device is a part of a stop collar. In further embodiments of the method the stop collar is a two part stop collar with the stop collar being attached to the pipe by the two parts of the stop collar being press fitted together. In embodiments of the method, when pressed together, the two parts of the stop collar are held together by a ratchet.

In embodiments of the method, the pipe attachment device is an attachment device to a downhole pipe in the oil industry. In embodiments of the method, the part of the function element that connects to an end part of a pipe attachment device is an end part of the function element. In embodiments of the method, the part of the function element that connects to an end part of a pipe attachment device is a mid-part of the function element located between the ends of the function element. In embodiments of the method an end part of a pipe attachment device is configured as the end part of a pipe attachment device. In embodiments of the method a part of a function element is configured as the part of a function element.

An assembly of a function element, pipe attachment device and pipe includes a pipe attachment device provided around a pipe and attached to the pipe. A function element is provided around the pipe and connected to the pipe attachment device. The pipe attachment device comprises one or more recesses on its outer surface. A part of the function element is retained by the one or more recesses so that the movement of the function element along the axis of the pipe is restricted.

A method of securing a function element to a pipe includes connecting an end part of a pipe attachment device to a part of a substantially tubular function element according to the method of any preceding claim. The pipe attachment device and connected function element are provided around a pipe. The part of the pipe attachment device is attached to the pipe.

In an embodiment of the method, the pipe attachment device is a first part of the pipe attachment device, attaching the first part of the pipe attachment device to the pipe comprises attaching a second part of the pipe attachment device to the first part of the pipe attachment device. in an embodiment of the method, the pipe attachment device is attached to the pipe by moving each of the two parts of the pipe attachment device towards each other along the longitudinal axis of the pipe. In an embodiment of the method, when pressed together, the two parts of the pipe attachment device are held together by a ratchet. In an embodiment of the method, each part of the pipe attachment device is a part of a stop collar.

Example Set 2

A method of preparing a pipe for lowering into a hole includes providing a function element around a pipe and increasing the outer diameter of part of the pipe. The function element retains the part of the pipe with increased diameter such that, when the pipe is lowered into a hole, the function element is pulled along by the pipe. In an embodiment of the method, the outer diameter of part of the pipe is increased by attaching a stop collar to the pipe. In an embodiment of the method, the outer diameter of part of the pipe is increased by an obstruction that is created by any of welding, spraying/supplying a substance that hardens, or moulding a substance around the outer circumference of the pipe.

Example Set 3

A stop collar for attaching to a pipe includes a sleeve and a split ring band. The sleeve is substantially tubular. The sleeve has a recess in its inner surface, wherein the recess extends around the entire inner circumference of the sleeve. There one or more holes within the sleeve, wherein each of the holes extends between an end face of the sleeve and the recess. The split ring band is arranged to be positioned within the recess such that, when a force is applied to the split ring band by pin(s) inserted within the one or more holes, the split ring band is configured to grip the pipe.

In an embodiment of the stop collar, within the recess, the inner diameter of the sleeve is tapered so that the inner diameter increases form one end of the recess to the other end of the recess. In an embodiment of the stop collar, the outer surface of the split ring band is tapered so that the outer diameter of the split ring band increases from one end of the split ring band to the other end of the split ring band. In am embodiment of the stop collar, the inner surface of the split ring band comprises one or more teeth for gripping the pipe. In an embodiment of the stop collar, the split in the split ring band comprises interlocking fingers. In an embodiment of the stop collar, the split in the split ring band is a linear slot.

A method of attaching a stop collar to a pipe, wherein the stop collar comprises a sleeve and a split ring band includes positioning a split ring band within a recess in the inner surface of a sleeve. The sleeve, with the split ring positioned in the recess of the sleeve, is provided around a pipe, causing the split ring band to grip the pipe by inserting one or more elements into holes of the sleeve that apply a force on the split ring band. In an embodiment of the method the stop collar is a stop collar as described above.

Example Set 4

A stop collar for attaching to a pipe, the stop collar includes a sleeve and a split ring collar. The sleeve is substantially tubular. The inner diameter of the sleeve is tapered at one end of the sleeve, around the entire inner circumference of the sleeve, such that the sleeve has a tapered end with the inner diameter of the tapered end decreasing from a maximum at said one end of the sleeve. At least a section of the inner surface of the tapered end of the sleeve comprises a plurality of ridges that extend around the entire inner circumference of the sleeve. The split ring collar, when the split ring is closed, is substantially tubular. The outer diameter of the split ring collar is tapered at one end of the split ring collar, around the entire outer circumference of the split ring collar, such that the split ring collar has a tapered end with the inner diameter of the tapered end decreasing from a maximum at said one end of the split ring collar. At least a section of the inner surface of the tapered end of the split ring collar comprises one or more of ridges that extend around the entire outer circumference of the split ring collar. The sleeve and split ring collar are arranged such that, when the sleeve and the split ring collar are provided around a pipe and moved relatively towards each other along the longitudinal axis of the pipe so that the tapered end of the split ring collar is forced into the tapered end of the sleeve, the split ring collar grips the pipe. The plurality of ridges on the inner surface of the sleeve and the one or more ridges on the outer surface of the split ring collar provide a ratchet mechanism that substantially maintains the relative position of the sleeve and the split ring collar when the split ring collar grips the pipe.

In an embodiment of the stop collar, the inner surface of the split ring collar comprises one or more teeth for gripping the pipe. In an embodiment of the stop collar, the split in the split ring collar comprises interlocking fingers In an embodiment of the stop collar, the split in the split ring collar is a linear slot. In an embodiment of the stop collar, the tapered end of the split ring collar comprises a plurality of fingers.

A method of attaching a stop collar to a pipe includes the sleeve of the stop collar as described above is provided around a pipe. The split ring of the stop collar as described above is provided around a pipe. The sleeve and split ring collar are moved relatively towards each other along the longitudinal axis of the pipe so that the tapered end of the split ring collar is forced into the tapered end of the sleeve such that the split ring collar grips the pipe.

Example Set 5

A stop collar part, wherein: the stop collar part comprises at least one hinge. At least two sections of the stop collar part are moveable about the at least one hinge such that the stop collar part is moveable between an open configuration and a closed configuration. In the closed configuration the stop collar part is substantially tubular. In the open configuration the stop collar part can receive a pipe, such that the stop collar part can be provided around a pipe by the stop collar part receiving the pipe when the stop collar part is in the open configuration and then moving the stop collar part to the closed configuration.

In an embodiment of the stop collar, the stop collar part is a sleeve. In an embodiment of the stop collar, the stop collar part is a male part of a stop collar that is configured to attach to a pipe when the male part is forced into a sleeve. In an embodiment of the stop collar, the interface between the two sections of the stop collar comprises interlocking fingers. In an embodiment of the stop collar, the two sections of the stop collar part are attached together when the stop collar part is in the closed configuration such that the stop collar part is unable to move to the open configuration. In an embodiment of the stop collar, when in the closed configuration, the stop collar part substantially corresponds to any of the sleeve, split ring band, split ring collar, end part of an attachment device or end part of a function element according to any of the embodiments disclosed herein.

A stop collar includes a first stop collar part and a second stop collar part. The stop collar is attachable to a pipe by providing the first and second stop collar parts around a pipe and forcing the first and second stop collar parts together. The first stop collar part and/or the second stop collar part is a stop collar part as described above.

A method of attaching a stop collar to a pipe, wherein the stop collar is a stop collar as described above and includes providing the first part of a stop collar around a pipe. The second part of a stop collar is provided around a pipe. The first and second parts of the stop collar are moved relatively towards each other along the longitudinal axis of the pipe so that the first and second parts of the stop collar are forced together. In an embodiment of the method, the first and/or second parts of the stop collar are provided around the pipe when there is no access to the end of the pipe.

Example Set 6

A stop collar part includes a first section and a second section. The first section and second section are configured such that they can form an attached configuration, in which the first and second sections are attached together, and the first and second sections are also configured to be separable from each other. When the first and second sections are in the attached configuration, the stop collar part is substantially tubular. The stop collar part can be provided around a pipe providing the separate first and second sections around the pipe and then attaching the first and second sections of the stop collar together.

In an embodiment of the stop collar part, the stop collar part is a sleeve. In an embodiment of the stop collar part, the stop collar part is a male part of a stop collar that is configured to attach to a pipe when the male part is forced into a sleeve. In an embodiment of the stop collar part, the interface between the two sections of the stop collar comprises a sliding joint such that the first and second sections of the stop collar are attachable to each other by sliding, along the surface of the pipe, the first and second sections relatively towards each other. In an embodiment of the stop collar part, further comprising attaching the two sections of the stop collar part together when the stop collar is in the attached configuration such that the first and second sections are unable to separate from each other. In an embodiment of the stop collar part, when in the closed configuration, the stop collar part substantially corresponds to any of the sleeve, split ring band, split ring collar, end part of an attachment device or end part of a function element according to any embodiments disclosed herein.

A stop collar includes a first stop collar part and a second stop collar part. The stop collar is attachable to a pipe by providing the first and second stop collar parts around a pipe and forcing the first and second stop collar parts together. The first stop collar part and/or the second stop collar part is a stop collar part according to any embodiments disclosed herein.

A method of attaching a stop collar to a pipe, wherein the stop collar is a stop collar as described above includes providing the first part of a stop collar around a pipe. The second part of a stop collar around a pipe. The first and second parts of the stop collar are moved relatively towards each other along the longitudinal axis of the pipe so that the first and second parts of the stop collar are forced together. In an embodiment of the method, the first and/or second parts of the stop collar are provided around the pipe when there is no access to the end of the pipe.

Example Set 7

A method of attaching a stop collar to a pipe includes providing a pipe with one or more holes in the outer surface of the pipe. A stop collar is attached to the pipe, wherein at least part of the stop collar is received within the one or more holes in the outer surface of the pipe. In an embodiment of the method, the one or more holes are a single groove extends all around the outer circumference of the pipe. In an embodiment of the method, the one or more holes are cut in the outer surface of the pipe. In an embodiment of the method, the stop collar is a tubular band, and said step of attaching the stop collar to the pipe includes heating the band so that the inner diameter of the band increases. The band is positioned above the one or more holes. The band is cooled so that the inner diameter of the band decreases. In an embodiment of the method, the pipe is a downhole pipe in the oil industry.

Example Set 8

A stop collar includes a stop collar part that is the end of a pipe attachment device according to any of the embodiments described above. The other end of the stop collar part is conjured as the sleeve, split ring collar or stop collar part according to any of the other embodiments described above.

The flowcharts and description thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A method of connecting an end part of a pipe attachment device to a part of a function element, the method comprising:
   aligning the longitudinal axis of a substantially tubular end part of a pipe attachment device with the longitudinal axis of a substantially tubular part of a function element;
   applying a force that moves the end part of the pipe attachment device and the part of the function element relatively towards each other along the longitudinal axis so that the contact between the end part of the pipe attachment device and the part of the function element causes each of a plurality of fingers on the end part of the pipe attachment device to elastically deflect; and
   further applying the force that moves the end part of the pipe attachment device and the part of the function element relatively towards each other so that each of the plurality of fingers on the end part of the pipe attachment device returns from their deflected position and is retained in one or more holes or one or more recesses in the part of the function element;
   wherein each of the plurality of fingers has a recess on its outer surface; and
   after each of the plurality of fingers has returned from the deflected position, the inner surface of the end of the function element between the one or more holes in the inner surface of the end of the function element and the tip of the end of the function element is retained within the recesses on the outer surfaces of the plurality of fingers, and wherein a length of each of the recesses on the outer surfaces of the plurality of fingers is substantially the same as a length of a part of the function element that is retained within the recesses so as to prevent axial movement of the function element along the pipe.

2. The method according to claim 1, wherein the end part of the pipe attachment device comprises a plurality of axially aligned slots and the region between any two adjacent slots provides one of the plurality of fingers.

3. The method according to claim 1, wherein a portion of the outer surface of each of the fingers is a ridge; and
   after each of the plurality of fingers has returned from the deflected position and is retained in one or more holes or one or more recesses in the end of the function element, the ridge on the outer surface of each the fingers is retained within the one of the one or more holes or one or more recesses in the inner surface of the function element.

4. The method according to claim 3, wherein the one or more holes or one or more recesses comprises a hole or recess corresponding to each of the fingers such that retention of the ridge on the outer surface of each of the fingers in one or more holes or one or more recesses on the inner surface of the function element substantially prevents relative rotation of the function element and the end part of the pipe attachment device.

5. The method according to claim 4, wherein each of the one or more holes or one or more recesses in the inner surface of the function element extends all the way through to the outer surface of the function element.

6. The method according to claim 1, wherein each of the fingers comprises a recess in its inner surface.

7. The method according to claim 6, further comprising inserting a split ring band in the recesses of the plurality of fingers after the end part of the pipe attachment device has been connected to the end part of the tubular function element.

8. The method according to claim 1, wherein the one or more holes or one or more recesses in the inner surface of the function element is a single recess in the inner surface and the function element is able to rotate relative to the end part of the pipe attachment device.

9. The method according to claim 1, where the function element is a centraliser, or a mid-piece between the end part of the pipe attachment device and a centraliser.

10. The method according to claim 1 wherein the end part of a pipe attachment device is a part of a stop collar.

11. The method according to claim 10, wherein the stop collar is a two part stop collar with the stop collar being attached to the pipe by the two parts of the stop collar being press fitted together.

12. The method according to claim 11, wherein, when pressed together, the two parts of the stop collar are held together by a ratchet.

13. The method according to claim 10, wherein one part of the two part stop collar is a male part comprising a second plurality of fingers.

14. The method according to claim 13, wherein the other part of the two part stop collar is a female sleeve, wherein when the male part and female sleeve are pressed together each of the second plurality of fingers is bent inwards to grip the pipe.

15. The method according to claim 1, wherein the pipe attachment device is an attachment device to a downhole pipe in the oil industry.

16. The method according to claim 1, wherein the part of the function element that connects to an end part of a pipe attachment device is an end part of the function element.

17. The method according to claim 1, wherein the part of the function element that connects to an end part of a pipe attachment device is a mid-part of the function element located between the ends of the function element.

18. An end part of a pipe attachment device configured as the end part of the pipe attachment device of claim 1.

19. A part of a function element configured as the part of the function element of claim 1.

20. The method according to claim 1, further comprising:
providing the pipe attachment device and function element around a pipe; and
attaching the pipe attachment device to the pipe.

21. The method according to claim 20, wherein the pipe attachment device is a first part of the pipe attachment device; and
attaching the first part of the pipe attachment device to the pipe comprises attaching a second part of the pipe attachment device to the first part of the pipe attachment device.

22. The method according to claim 21, wherein the pipe attachment device is attached to the pipe by moving each of the two parts of the pipe attachment device towards each other along the longitudinal axis of the pipe.

23. The method according to claim 22, wherein, when pressed together, the two parts of the pipe attachment device are held together by a ratchet.

24. The method according to claim 21, wherein each part of the pipe attachment device is a part of a stop collar.

25. An assembly of a function element, pipe attachment device and pipe, the assembly comprising:
a pipe attachment device provided around a pipe and attached to the pipe; and
a function element provided around the pipe and connected to the pipe attachment device;
wherein:
the pipe attachment device comprises one or more recesses on its outer surface; and
wherein a length of each of the recesses on the outer surfaces of the plurality of fingers is substantially the same as a length of a part of the function element that is retainable within the one or more recesses so as to prevent axial movement of the function element along the pipe.

26. A method of connecting an end part of a pipe attachment device to a part of a function element, the method comprising:
aligning the longitudinal axis of a substantially tubular end part of a pipe attachment device with the longitudinal axis of a substantially tubular part of a function element;
applying a force that moves the end part of the pipe attachment device and the part of the function element relatively towards each other along the longitudinal axis so that the contact between the end part of the pipe attachment device and the part of the function element causes each of a plurality of fingers on the end part of the pipe attachment device to elastically deflect; and
further applying the force that moves the end part of the pipe attachment device and the part of the function element relatively towards each other so that each of the plurality of fingers on the end part of the pipe attachment device returns from their deflected position and is retained in one or more holes or one or more recesses in the part of the function element,
wherein the end part of a pipe attachment device is a part of a stop collar; and wherein the stop collar is a two part stop collar with the stop collar being attached to the pipe by the two parts of the stop collar being press fitted together.

27. The method of claim 26, wherein the one or more holes or one or more recesses in the inner surface of the function element is a single recess in the inner surface and the function element is able to rotate relative to the end part of the pipe attachment device.

28. The method of claim 26, wherein, when pressed together, the two parts of the stop collar are held together by a ratchet.

* * * * *